United States Patent [19]
McGinnis

[11] 4,061,223
[45] Dec. 6, 1977

[54] STRETCHABLE BELT CONVEYOR

[75] Inventor: Hebert E. McGinnis, Akron, Ohio

[73] Assignee: The First National Bank of Akron, Trustee, Akron, Ohio

[21] Appl. No.: 618,259

[22] Filed: Sept. 30, 1975

[51] Int. Cl.$^2$ .......................................... B65G 41/00
[52] U.S. Cl. .................................. 198/821; 198/831; 198/833; 198/847; 198/862
[58] Field of Search ................. 198/109, 117, 126, 11, 198/191, 192 R, 201, 203, 208, 831, 833, 847, 820, 835, 821, 862

[56] References Cited
U.S. PATENT DOCUMENTS

| 780,145 | 1/1905 | Vaughan | 198/192 R X |
|---|---|---|---|
| 2,243,538 | 5/1941 | Salfisberg | 198/835 |
| 2,593,158 | 4/1952 | Lorig | 198/192 R X |
| 2,955,699 | 10/1960 | Lanier | 198/109 |
| 2,986,267 | 5/1961 | Carlson | 198/208 |
| 3,268,065 | 8/1966 | Thomson | 198/203 |
| 3,310,161 | 3/1967 | Kraft | 198/847 |
| 3,545,598 | 12/1970 | McGinnis | 198/192 X |
| 3,557,941 | 1/1971 | Thomson | 198/201 |
| 3,630,340 | 7/1969 | Bouzat et al. | 198/201 |

Primary Examiner—John J. Love
Assistant Examiner—Douglas D. Watts
Attorney, Agent, or Firm—Frederick K. Lacher

[57] ABSTRACT

A stretchable U-shaped conveyor belt with reinforcing members extending transversely of the belt and spaced apart longitudinally of the belt. Elastic stretchable material between the reinforcing members permits prestretching the belt so that the edges remain in tension when the belt passes around curves and thereby maintains the molded shape of the belt in horizontal and vertical curves. The conveyor belt is driven by a power belt and guided by guide rollers. The power belt and conveyor belt are carried by support rollers mounted on frames at spaced-apart positions along the belt path. The frames are fastened to a resilient, flexible spine member which provides for positioning of the frames around vertical and horizontal curves. The U-shaped cross section of the belt is also maintained by U-shaped reinforcing members of high modulus material which are positioned in two spaced layers within the molded body of the belt. Layers of cords of low modulus textile material between the reinforcing members provide resistance to tearing and strengthen the belt for holding fasteners as well as increase the effectiveness of the U-shaped reinforcing members.

20 Claims, 11 Drawing Figures

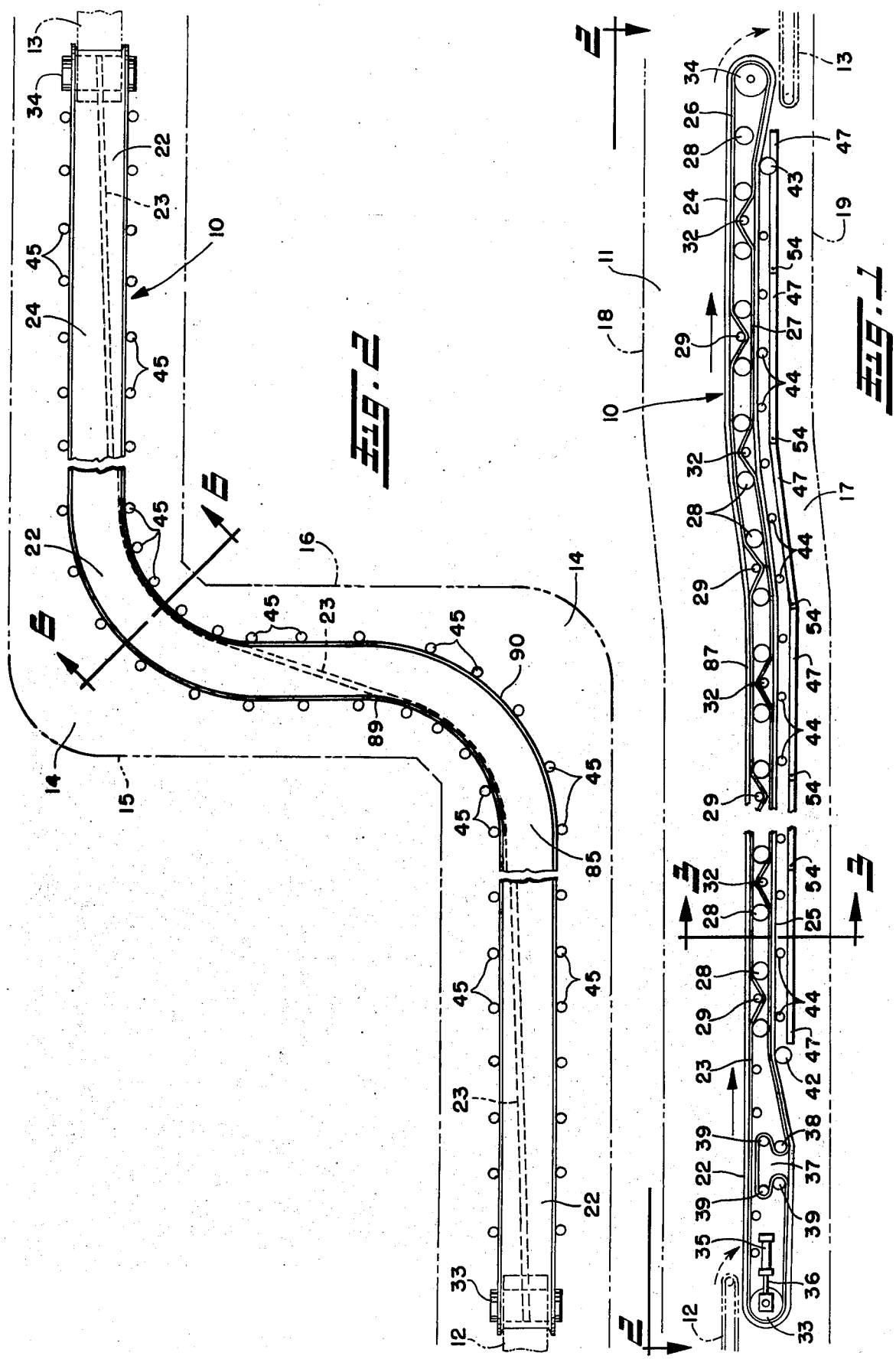

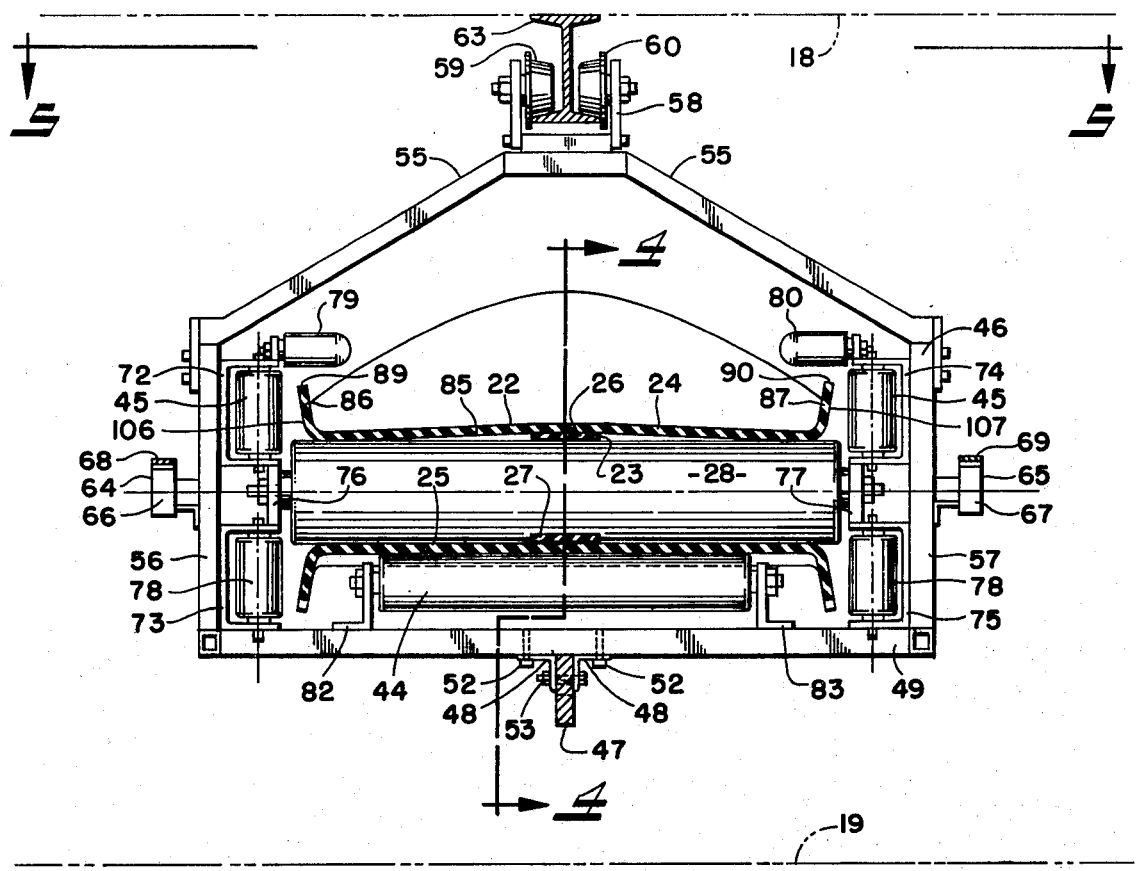
_Fig. 3_
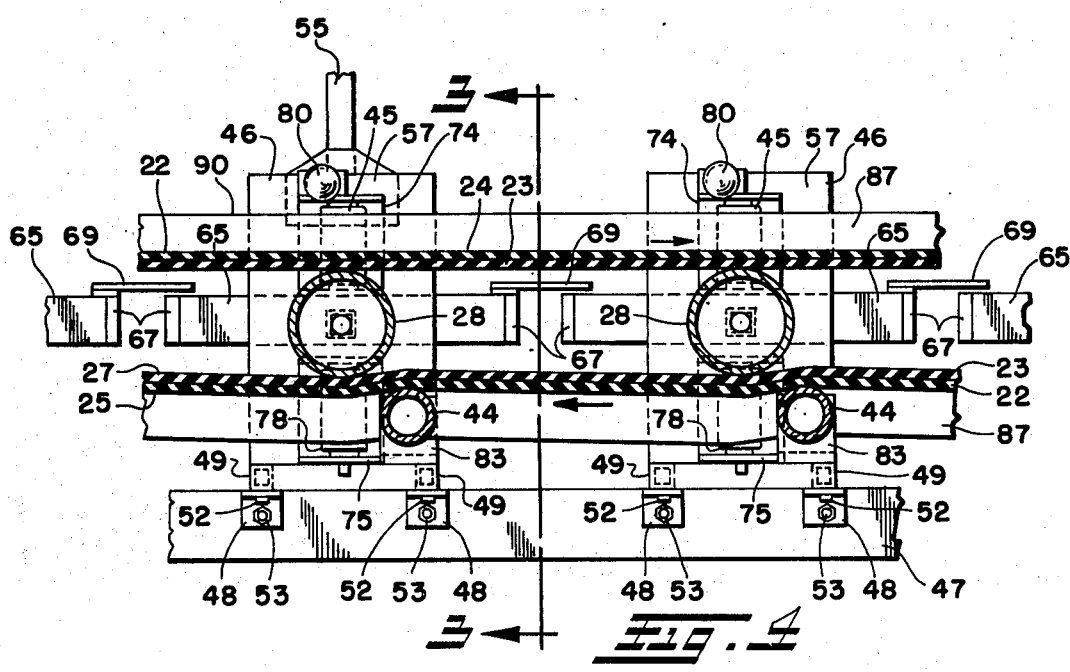
_Fig. 4_

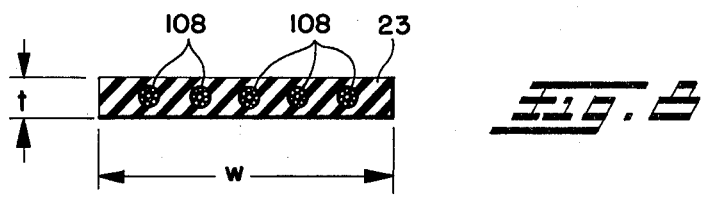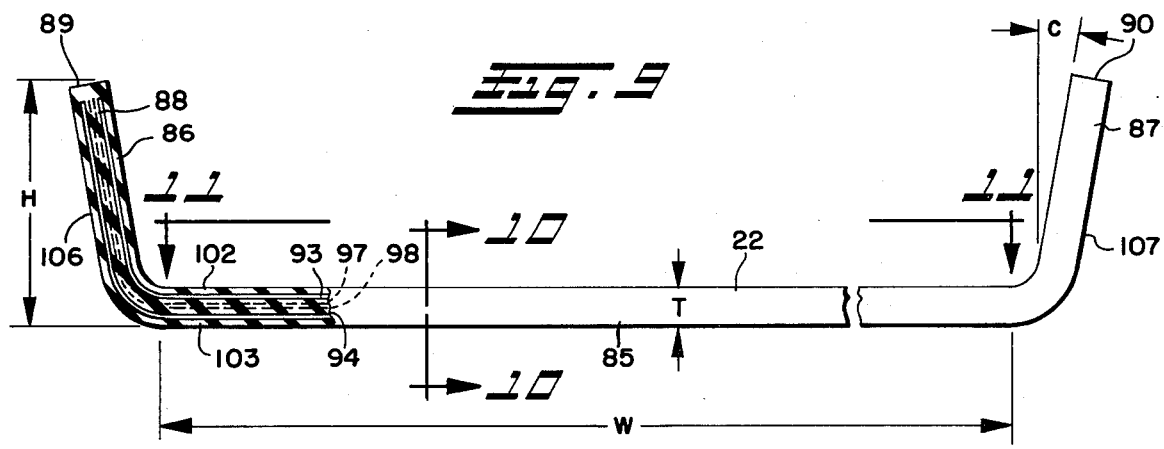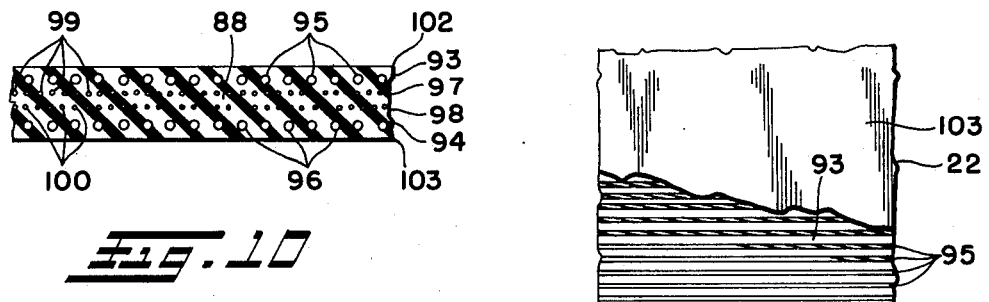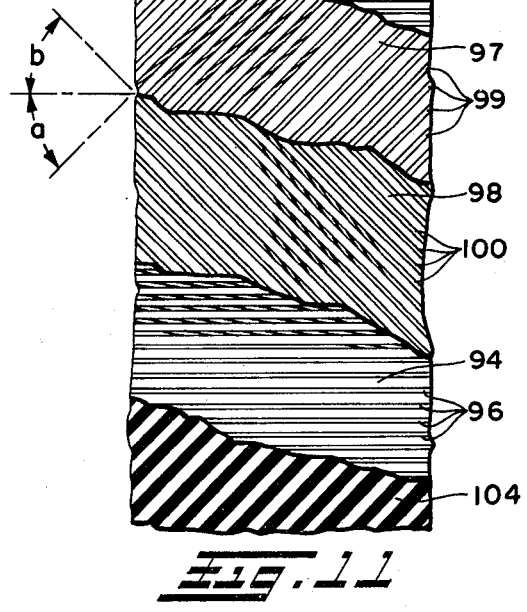

STRETCHABLE BELT CONVEYOR

BACKGROUND OF THE INVENTION

1. Field of the Invention

This invention relates to the conveying of material and objects by endless belts and especially to belts directed around curves in the vertical or horizontal directions. The invention also relates to long conveyors and especially to conveyors for transferring material where the height of the conveyor is limited as by the thickness of a vein of coal being mined.

2. Description of the Prior Art

The applicant has previously designed a belt and conveyor system in an attempt to convey material around curves and the belt conveyor is described in U.S. Pat. No. 3,701,411 whereas the belt construction is described in U.S. Pat. No. 3,545,598.

U.S. Pat. No. 3,545,598 describes a belt having a central longitudinally extending inextensible spine and corrugations extending from the spine transversely to the edges supported on moving surfaces extending at an angle to the corrugations for bridging the grooves of the corrugations.

U.S. Pat. No. 3,701,411 describes a conveyor system in which the belt of U.S. Pat. No. 3,545,598 is supported on a mobile conveyor system having a self-propelled tractor pivotally connected at each end of a chain of pivotally interconnected, single axle carriages.

Two-belt conveyor systems where one belt drives the other belt have been devised in the past and the following patents are representative of some of these systems:

U.S. Pat. No. 3,261,452 describes a belt conveyor system in which there are two belts. One of the belts drives the other belt and both belts have separate tensioning means or take-ups.

U.S. Pat. No. 3,268,065 describes a two-belt system in which the drive belt has a ribbed surface for engagement with the ribbed surface of the load-carrying belt to provide better frictional contact between the belts. The patent also describes apparatus for aligning the drive belt with the conveyor belt so that the ribbed surfaces match. The load-carrying belt is shaped by troughing rollers at the sides. Separate take-ups are provided for the two belts.

U.S. Pat. No. 3,557,941 describes a two-belt system in which the load-carrying belt has hinged sides and laterally extending reinforcing members made up of three metal strips disposed in end-to-end relationship. A layer of fabric is embedded in the belt and extends longitudinally thereof. The hinged sides of the load-carrying belts are supported in a troughed position by outwarding protruding projections or support shoes which engage grooves in the drive belt.

While these patents and other described two-belt systems, they do not show systems in which both belts are tensioned by the same take-up. Also, the belts must be trained by a roller adjustment and relative lateral movement of the drive belt with respect to the conveyor belt is prevented. In none of these patents are both belts passed around the same terminal pulley nor is the container belt made with transversely extending reinforcing members and elastic material between the transverse members for stretching of the container belt in the longitudinal direction so that both belts can be passed over a single terminal pulley without relative slippage between the two belts.

U.S. Pat. No. 3,144,929 describes a single belt conveyor for transporting fluent materials such as particulate solids, slurries and liquids. The belt has a U-shaped cross section which is filled by a second belt means or insert for uphill or downhill runs. Elongation of the belt is not to exceed one or two percent. The belt is relatively thick in relationship to its overall width to maintain its shape and provide rigidity in operation. While this patent shows a belt with a U-shaped cross section, it does not describe a two-belt system in which the container belt in thin-walled and reinforced by transverse U-shaped reinforcing members with elastic material between the members to permit stretching of the container belts in the amount of up to 25 percent elongation as in the present invention. The patent also does not describe a conveyor capable of conveying bulk materials such as large rocks and coal where heavy loads must be carried and wear and maintenance are important considerations as in the present invention.

Belts have also been devised with elastomeric material and transverse reinforcement to provide transverse stiffness. For example, U.S. Pat. Re. No. 26,731 describes a flat belt having two parallel layers of flexible metal cords which extend transversely across the belt in combination with one layer of woven fabric or longitudinal textile cords extending between the metal cord layers. The woven fabric or textile cords limit belt stretch and provide a main tension layer.

Great Britain Pat. No. 1,083,536 dated Sept. 13, 1967 describes a flat belt conveyor system having only one belt and transversely extending steel rods to provide transverse rigidity. The transversely extending reinforcing rods do not extend into the side ribs and there is no drive belt so that the belt construction must include longitudinal reinforcing members to carry a load such as that indicated by the deflection of the belt. This reinforcement may be the canvas or other textile material wrapped around the rods.

In neither of these patents is there shown a belt in which there are transversely extending reinforcing members with elastic material between the reinforcing members being stretchable in a longitudinal direction as in the container belt of the present invention. Also, there is no showing of the reinforcing members extending into upwardly extending side members of the container belt to maintain a U-shaped cross section of the container belt as in the present invention.

SUMMARY OF THE INVENTION

The present invention is directed to a two-elt conveyor for conveying bulk materials such as coal or rock over long distances and around curves in the vertical or horizontal directions without requiring transfer of the material from one conveyor to another. The container belt is molded with a transverse U-shaped cross section and has U-shaped transversely extending reinforcing members at spaced-apart positions longitudinally of the belt embedded in the elastic material of the belt. The sidewalls of the container belt are supported and the shape of the container belt is maintained by the reinforcing members extending into the sidewalls while at the same time the elastic material between the reinforcing members is stretchable in the longitudinal direction so as not to limit the elongation of the container belt. By initially stretching the container belt so as to elongate it from five to ten percent, the U-shaped cross section is maintained as the belt is directed around curves in the horizontal and vertical direction.

An endless, flexible power belt which is longitudinally reinforced drives the container belt and supports it between support rollers spaced longitudinally along the belt path. The power belt is not as wide as the container belt and is movable in the transverse direction relative to the container belt around the transverse curves in the belt path. Guide rollers at the sides of the belt path and overlapping the edges of the container belt guide the container belt and power belt along the belt path. The support rollers and guide rollers may be mounted on longitudinally extending frame members connected by a flexible spine of resilient material to accommodate tranverse bends in the belt path and position the frames. The spine members may be segmented with pivotal connections permitting relative pivotal movement of the connected spine members in the vertical direction so that material on the conveyor may be transported around curves in the vertical direction.

The support rollers may include snub rollers in supporting engagement with the return run of the container belt to urge the return run of the power belt into driving engagement with the support rollers and thereby drive the upper run of the container belt along the belt path.

Both the container belt and power belts pass over the same terminal pulleys and because of the stretchability of the container belt, the relative slippage between the power belt and container belt is substantially eliminated. Furthermore, only one take-up to tension the power belt and container belt is required.

The container belt may be molded in a U-shaped cross section of elastic material and have at least two spaced layers of transversely extending U-shaped reinforcing members of high modulus material molded in the body of elastic material. The reinforcing members extend into the side portions of the belt and are positioned in spaced-apart locations longitudinally of the belt. The elastic material between the reinforcing members is stretchable in a longitudinal direction permitting stretching of the base and side portions. Transversely extending cords of steel wire provide a rigidity of the belt in the transverse direction and low modulus textile cords laid on an opposite bias resist ripping of the belt and strengthen the belt for holding fasteners as well as increase the effectiveness of the cords of steel wire in providing transverse stiffness of the belt.

With this conveyor and belt construction, one container belt may be used over a long distance and around horizontal and vertical curves eliminating transfer of material from one belt to another and thereby decreasing maintenance and wear of the belt. The elastic stretchability of the container belt also permits the use of smaller diameter terminal pulleys and the guiding of the container belt without the necessity of positioning the supporting rollers to train the belts. The power belt can drift from side-to-side and is guided by contacting the side guide rollers.

By utilizing the present invention, bulk materials may be conveyed over long distances and around curves in the vertical and horizontal directions in an efficient manner with apparatus requiring a minimum of maintenance and manufacturing expense.

BRIEF DESCRIPTION OF THE DRAWINGS

FIG. 1 is a schematic side elevational view of a stretchable belt conveyor with parts being broken away and with the floor line and roof line of the conveyor passage as well as the loading and unloading conveyors being shown in chain-dotted lines.

FIG. 2 is a plan view of the conveyor shown in FIG. 1 taken along the plane of line 2—2 in FIG. 1 with parts being broken away and the sides of the conveyor passage being shown in chain-dotted lines.

FIG. 3 is an enlarged sectional view of the conveyor showing one of the roller frames taken along the plane of line 3—3 in FIG. 1.

FIG. 4 is an enlarged fragmentary sectional view of a portion of the conveyor taken along the planes of line 4—4 in FIG. 3 with parts being broken away.

FIG. 8 is a further enlarged cross-sectional view of the power belt showing the positions of the longitudinal reinforcing members.

FIG. 9 is a further enlarged cross-sectional view of the container belt showing the transverse reinforcing members with parts being broken away.

FIG. 10 is a still further enlarged fragmentary sectional view of the container belt taken along the plane of line 10—10 in FIG. 9.

FIG. 11 is a fragmentary cutaway view of the container belt taken along the plane of line 11—11 in FIG. 9.

DETAILED DESCRIPTION

Figure 5:
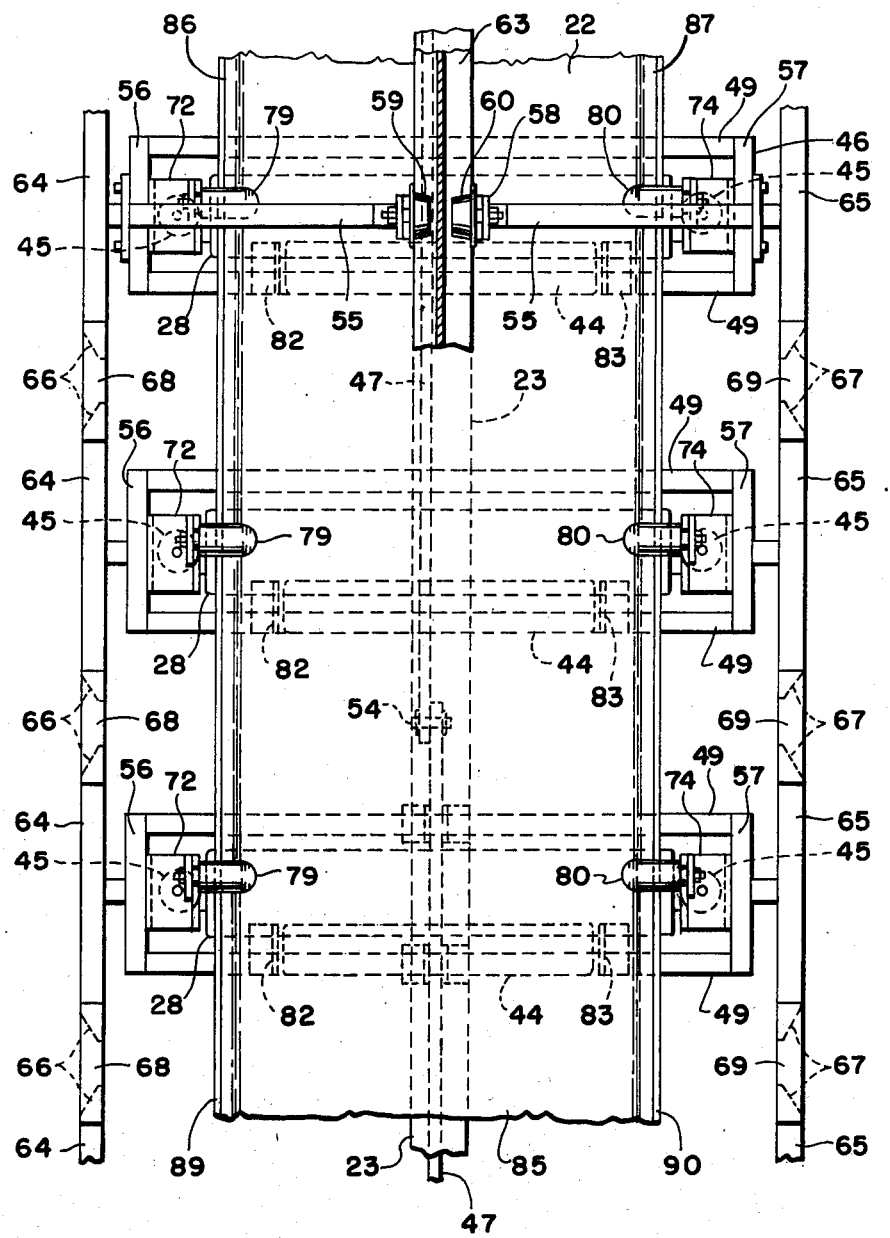
FIG. 5 is an enlarged fragmentary plan view of a portion of the conveyor taken along the plane of line 5—5 in FIG. 3.

Referring to FIGS. 1 and 2, a conveyor 10 is shown located in a curved, sloped passage 11 as in a coal mine for conveying bulk materials such as coal from a loading belt 12 adjacent the mine face to a stationary line conveyor or panel belt 13. The conveyor 10 extends around bends or horizontal curves 14 in the passage 11 indicated by sides 15 and 16 of the passage and through a vertical curve or sloped portion 17 indicated by roof 18 and floor 19 of the passage.

The conveyor 10 has an endless, flexible container belt 22 which is driven by an endless, flexible power belt 23. The container belt 22 has an upper run 24 and a lower run 25 while the power belt 23 has an upper run 26 and a lower run 27. The upper run 26 of the power belt 23 is supported on support rollers 28 extending transversely of the conveyor 10 at spaced-apart positions longitudinally thereof. The upper run 24 of the container belt 22 is supported by the power belt 23 and by the support rollers 28. Power belt hold-down rollers 29 are located between the support rollers 28 at spaced-apart intervals along the upper run 26 of the power belt 23 for holding the power belt down on the support rollers and especially in the sloped portion 17. Other power belt hold-down rollers 32 are located between the support rollers 28 at positions spaced from the first-mentioned hold-down rollers 29 and the lower run 27 of the power belt 23 extends around these hold-down rollers to hold the lower run 27 of the power belt against the support rollers.

Terminal pulleys such as tail pulley 33 and discharge pulley 34 are located at the ends of the conveyor 10. Both the container belt 22 and power belt 23 extend around the tail pulley 33 and discharge pulley 34. A tension-applying means such as a take-up 35 including a hydraulic piston-cylinder assembly is connected to the tail pulley 33 by a piston rod 36. By applying a constant hydraulic pressure to the piston-cylinder assembly of the take-up, a predetermined tension may be maintained in the container belt 22 and power belt 23. Also, only one take-up 35 is necessary for the container belt 22 and power belt 23.

A power belt drive 37 is located near the tail pulley 33 and includes a drive pulley 38 driven by an electric motor or other suitable power means and also includes idler pulleys 39 for directing the power belt around the drive pulley and carrying the lower run 27 of the power belt 23 back into engagement with the lower run 25 of the container belt 22. End snub rollers 42 and 43 may be located near the power belt drive 37 and the discharge pulley 34 for directing the lower run 25 of the container belt 22 and the lower run 27 of the power belt 23 at the ends of the conveyor 10.

Between the end snub rollers 42 and 43 are transversely extending, spaced-apart support rollers or snub return rollers 44 positioned for engagement with the lower run 25 of the container belt 22. As shown in FIG. 2, vertical guide rollers 45 are located at the sides of the conveyor 10 for guiding the container belt 22 and power belt 23 especially around the curves 14.

As shown more clearly in FIGS. 3, 4 and 5, the container belt 22 and power belt 23 are supported on a supporting structure including frame members such as roller frames 46 which are attached to flexible spine members 47 by frame attachments such as angle brackets 48 fastened to transverse members 49 of the roller frames and to the flexible spine members by studs 52 and bolt and nut assemblies 53, respectively. As shown in FIGS. 1 and 5, the flexible spine members 47 are pivotally joined together by transversely extending pivot pins 54 for vertical movement over an inclined belt path. Although one of the roller frames 46 may be mounted on each of the spine members 47, it is preferred that more than one of the roller frames be mounted on each of the spine members as shown FIGS. 1, 4 and 5.

At least one of the roller frames 46 mounted on each of the spine members 47 contains means for supporting the conveyor 10 and in the present embodiment, as shown in FIGS. 3, 4 and 5, one of the roller frames includes support means such as a hanger frame 55 fastened to vertical frame members 56 and 57 connected to the transverse members 49. The hanger frame 55 is attached to a hanger 58 on which wheels 59 and 60 are rotatably mounted. A monorail 63 having an I-beam cross section is mounted on the roof 18 at a position spaced from the sides 15 and 16 of the passage 11 with the wheels 59 and 60 in rolling engagement for movement of the conveyor 10 through the passage. It is understood that an alternative arrangement would be to provide the transverse frame members 49 with a supporting carriage having wheels in engagement with the floor 19. It is also contemplated to support the conveyor 10 by a monorail 63 at one portion of the conveyor and by a carriage rolling on the floor 19 in another portion of the conveyor.

At the sides of each of the roller frames 46 are longitudinally extending side frame members 64 and 65 with ends 66 and 67 spaced apart a predetermined distance and the roller frames at spaced positions as shown in FIG. 5. Lateral control plates 68 and 69 on the ends 66 and 67, respectively, of the side frame members 64 and 65 overlap the adjacent ends to limit the relative lateral movement of the frames 46. The ends 66 and 67 of the side frame members 64 and 65, respectively, are disposed for abutting engagement during bending of the conveyor 10 around a horizontal curve 14 to limit the angular movement of the frames.

Roller supporting brackets 72, 73 74 and 75 are mounted on the vertical frame members 56 and 57 and on the transverse members 49. The transverse support rollers 28 are rotatably mounted on plates 76 and 77 attached to the brackets 72, 73 and 74, 75. The vertical guide rollers 45 for the upper run 24 of the container belt 22 and the upper run 26 of the power belt 23 are mounted on the brackets 72 and 74 while lower run vertical guide rollers 78 are rotatably mounted on the supporting brackets 73 and 75 for guiding the lower run 27 of the power belt and the lower run 25 of the container belt. These upper run vertical guide rollers 45 and lower run vertical guide rollers 78 are positioned with axes at substantially right angles to the axes of the support rollers 28, as shown in FIG. 3.

Extending transversely of the belt path over the edges of the container belt 22 are guide rollers such as container belt hold-down rollers 79 and 80 mounted on brackets 72 and 74, respectively, of each of the roller frames 46. The snub return rollers 44 extending transversely of the belt path are mounted on brackets 82 and 83 fastened to the transverse frame members 49 for engagement of the rollers with the lower run 25 of the container belt 22. Preferably the snub return rollers 44 are located in an elevated position and extend into the belt path between the support rollers 28 so as to urge the lower run 27 of the power belt 23 into driving engagement with the surface of the support rollers. The support rollers 28 are thereby driven in a clockwise direction, as shown in FIGS. 1 and 4, to drive the upper run 24 of the container belt 22 which is urged against the surface of the support rollers by load L of coal, rocks or other bulk material carried by the container belt. The snub return rollers 44 are also located at a position spaced longitudinally from the support rollers 28 such that the snub return rollers engage the lower run 25 of the container belt 22 prior to the engagement of the belt with the support rollers. The belts 22 and 23 move in the directions indicated by the arrows in FIG. 4.

Where desirable, the power belt hold-down rollers 29 and 32 may be mounted on roller frames 46 (not shown) fastened to the spine members 47 at spaced-apart positions between the frame members carrying support rollers 28 and return rollers 44.

Figure 7:
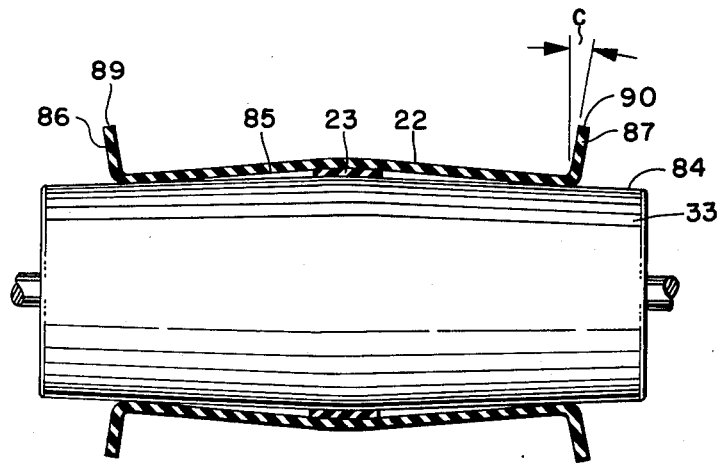
FIG. 7 is an end view of the conveyor showing a terminal pulley with the belts in section.

Referring to FIG. 7, an end view of the tail pulley 33 is shown in which the surface 84 is crowned for centering the power belt 23 and bending the container belt 22. The discharge pulley 34 may also have a crown surface similar to that of surface 84 of the tail pulley 33.

Referring to FIGS. 1, 2, 9, 10 and 11, the container belt 22 has a base portion 85 and side portions 86 and 87 extending longitudinally of the belt. The container belt 22 is molded with a channel or U-shaped cross section of elastic material 88 such as rubber or other rubberlike material in an elongated, flexible body which may be connected at the ends to provide an endless belt. The container belt 22 may have longitudinally extending edges 89 and 90 on the side portions 86 and 87. Embedded in the elastic material 88 of the container belt 22 are at least two spaced layers 93 and 94 of reinforcing members 95 and 96 of high modulus material such as steel wire extending transversely of the belt between the edges 89 and 90. Each of the members 95 and 96 are positioned in spaced-apart locations longitudinally of the belt and are generally U-shaped.

Between the layers 93 and 94 of high modulus reinforcing members, two layers 97 nd 98 of textile cords 99 and 100, respectively, having a low modulus of elasticity such as nylon are embedded in the belt 22. The cords 99 and 100 extend transversely of the belt 22 at opposite bias angles ($a$) and ($b$), as shown in FIG. 11. The bias angles ($a$) and ($b$) are 45° in the embodiment shown; however, they may range from 30 to 45°. These layers 97 and 98 of low modulus material provide for tear resistance and fastener reinforcement of the belt 22. In addition, the cords 99 and 100 contribute to the transverse rigidity of the belt 22 provided by the members 95 and 96 of the layers 93 and 94 of high modulus material.

Preferably the container belt 22 is thin with relation to the width of the base portion 85. For example, in the embodiment shown in FIGS. 9, 10 and 11, the width of the base portion 85, indicated by the letter W, is 28.8 inches and the thickness, indicated by the letter T, is approximately ½ inch. Preferably the thickness T of the container belt 22 is less than one-twelfth the width W of the base portion 85.

The container belt 22 has a top cover 102 and a bottom cover 103 which may be of the same elastic material 88 of the belt body or of a more wear-resistance material. In the present embodiment, the container belt 22 is for an underground coal mining installation and the elastic material 88 is a flame-resistant combination of neoprine and SBR rubber. Also, the side portions 86 and 87 have a height, indicated by letter H in FIG. 9, of 3¼ inches. For an overland installation, the container belt 22 may have a height H of up to 6¼ inches for a belt with a base portion width W of 28.8 inches. For aboveground installtions, the elastic material 88 may be a combination of GRS and SBR rubber. Preferably the elastic material 88 is highly stretchable and has a durometer of 65 to 75. In the embodiment shown, the top cover 102 has a thickness of 0.09375 inches. The layers 93 and 94 of high modulus material each have a thickness of 0.090 inches and the elastic material 88 containing the layers 97 and 98 of low modulus textile cords 99 and 100 has a thickness of 0.09375 inches. The bottom cover 103 has a thickness of 0.125 inches. The reinforcing members 95 and 96 are steel wires having a diameter of 0.050 inches and are spaced longitudinally of the belt at a spacing of seven wires to the inch. In other applications, the members 95 and 96 may have a diameter of 0.070 inches and be spaced at a spacing of fourteen wires per inch. The members 95 and 96 are positioned to extend transversely of the belt; however, they may be at a slight angle on the order of 5° from a direction transverse of the belt. In other applications, the thickness T of the belt 22 may be greater than ½ inch but preferably not over one inch.

The side portions 86 and 87 are substantially vertical with relation to the base portion 85 and in the present embodiment are tilted outwardly of the belt through an angle ($c$) which is around 10° from the vertical.

The layers 97 and 98 of low modulus textile cords 99 and 100 of the present embodiment are of nylon with the cords having a diameter of 0.021 inches and being spaced 16 cords per inch.

The container belt 22 is operable in a stretched condition wherein the elastic material 88 between the transverse members 95 of layer 93 of high modulus material and members 96 of layer 94 of high modulus material is stretched. Preferably the container belt 22 is prestretched to provide an elongation of from 5 to 10 percent with the elastic material 88 being stretchable in an amount up to 25 percent elongation of a portion of the belt such as the portion at the edges 89 and 90 when the belt passes over a terminal pulley, as, for example, tail pulley 33 or discharge pulley 34. As the container belt 22 passes over the terminal pulleys, the angle ($c$) of tilt of the side portions 86 and 87 will increase.

Although the container belt 22 is stretchable in the longitudinal direction, the transverse members 95 and 96 of high modulus material such as steel wire provide a transverse rigidity to support the load L carried by the belt. The side portions 86 and 87 not only contain the load L but also provide bearing surfaces 106 and 107 for engaging the vertical guide rollers 45 and 78 as the belt 22 is directed around curves 14, shown in FIG. 2. In operation of the container belt 22 around curves 14 of the passage 11, shown in FIG. 2, the edge 89 is elongated a different amount than the edge 90; however, both edges are maintained in tension in the longitudinal direction, as, for example, edge 90 may be elongated 6 to 7 percent whereas edge 89 may be elongated not less than 3 percent while the base portion 85 may be elongated at some intermediate figure such as 5 percent.

The power belt 23, as shown in FIG. 8, has longitudinally extending reinforcing members such as steel cables 108 located at spaced-apart positions transversely of the belt. The power belt 23 may be molded of resilient rubberlike material such as neoprene and SBR rubber for an underground mining application, as shown in this embodiment. The power belt 23 has a width ($w$) less than the width W of the container belt 22 and in this case the width ($w$) is 4 inches. The power belt 23 may have a thickness ($t$) of ½ inch for the embodiment shown. In overland, above-ground installations, the power belt 23 may be of a combination of GRS and SBR rubber and also the width ($w$) may be increased to 18 inches for a container belt having a base portion with a width W of 28.8 inches.

The conveyor 10, shown in FIGS. 1 and 2, is supported on a monorail 63, shown in FIG. 3, fastened to the ceiling 18 of passage 11 and extending around horizontal curves 14 in the passage. For each flexible spine member 47, at least one of the roller frames 46 attached to the spine member has a hanger frame 55 conneced to a hanger 58 containing wheels 59 and 60 movable along the monorail 63. As the conveyor 10 is moved through the passage 11 and around the horizontal curves 14, each of the flexible spine members 47 in the curves will be subject to bending forces and as the spine member is bent around the curve, the roller frames 46 mounted on the spine member will be turned at an angle. Due to the resiliency of the spine members 47, the angle through which the roller frames 46 are turned will conform with a smooth curve around the horizontal curves 14 in the passage 11.

The relative angular movement of the roller frames 46 is limited by the distance between the ends 66 and 67 of the side frame members 64 and 65, respectively, and in the present application, the maximum curvature of the conveyor 10 is limited to a radius of 20 feet.

Figure 6:
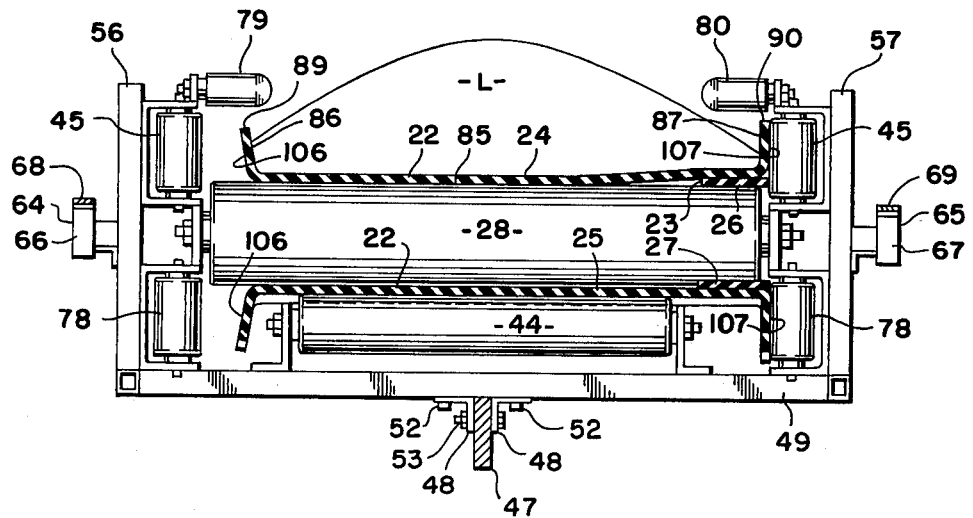
FIGS. 6 is an enlarged sectional view taken along the plane of line 6—6 in FIG. 2 showing the position of the belts in a curved portion of the conveyor.

As shown in FIGS. 2 and 6, the power belt 23 is movable transversely of the conveyor around curves 14 in that it has a width ($w$) less than the width W of the container belt 22. As shown in dotted lines in FIG. 2, the power belt 23 is centered at the tail pulley 33 after which it is pulled or "floats" from one side to the other side of the conveyor as the conveyor moves the load L through the curves 14. The power belt 23 then returns to the centered position at the discharge pulley 34. The power belt 23 is pulled to the side of the conveyor 10 at the horizontal curve 14 and engages vertical guide rollers 45 at the edge. The container belt 22 holds upper run 26 of the power belt 23 in a horizontal position as the belts bend around the curves 14. This is in addition to the power belt hold-down rollers 29 which are spaced at intervals along the conveyor 10, as shown in FIG. 1.

While the upper run 26 of the power belt engages the vertical guide rollers 45, the lower run 27 of the power belt 23 engages the lower run guide rollers 78 at the curves 14, as shown in FIG. 6. The snub return rollers 44 engaging the base portion 85 of the lower run 25 of the container belt 22 also serves to hold the lower run 27 of the power belt in position.

In the horizontal curves 14 of the passage 11, the container belt 22 is urged to one side of the conveyor 10, as shown in FIGS. 2 and 6, until the bearing surface 107 on the side portion 87 engages vertical guide rollers 45 and 78. The upper run 24 of the container belt 22 is held down on the support rollers 28 by the load L and by the spaced-apart, transversely extending reinforcing members 95 and 96 in the layers 93 and 94 of high modulus material. The elastic material 88 of the container belt 22 between the members 95 of layer 93 and members 96 of layer 94 will be further elongated in the side portion 86 and the base portion 85 adjacent the side portion 86 while the elastic material in the side portion 87 will continue to be stretched but to a lesser amount as will the elastic material in the base portion adjacent the side portion 87. In this way the container belt 22 will maintain its U-shaped or channel-shaped cross section as it is moved around the horizontal curves 14 of the passage 11. The container belt hold-down rollers 80 are positioned over the edge 90 of the side portion 87 for engagement in the event the container belt 22 is urged upwardly away from the support roller 28, as shown in FIG. 6.

The power belt 23 not only engages the container belt 22 but is in driving engagement with the support rollers 28 so that even though the power belt is not in engagement with the container belt throughout the base portion 85, the surface of the support rollers engages the base portion and drives the container belt. The power belt 23 also bridges the space between the support rollers 28 and reduces the number of support rollers required for the conveyor.

Although the power belt drive 37 is shown adjacent the tail pulley 33, it may be located at other positions along the conveyor 10. In addition, other power belt drives may be added at intervals along the conveyor to supplement the drive of power belt 37 and therefore make possible greater length conveyors.

In preparing the conveyor 10 for operation, the container belt 22 is spliced to a length such that when the power belt 23 is tensioned to an amount necessary to drive the conveyor, the container belt will be prestretched in an amount such that it will be elongated from 5 to 10 percent. This elongation is made possible by the unique construction of the container belt 22 having side portions 86 and 87 to retain the load L while at the same time providing bearing surfaces 106 and 107 for rolling engagement with the vertical guide rollers 45 and 78. The transverse rigidity of the container belt 22 provided by the layers 93 and 94 of high modulus, transversely extending members 95 and 96 in these layers maintains the U-shaped cross section of the belt in horizontally curved sections of the conveyor 10 while at the same time permits the maintenance of a minimum amount of stretching in all portions of the belt for carrying the load L around the horizontal curves 14.

The pivotal connections provided by pivot pins 54 in the flexible spine memers 47 provide for vertical movement of the conveyor 10 over the sloped portion 17, shown in FIG. 1. In order to retain the container belt 22 in concave curves of the upper run 24, the container belt hold-down rollers 79 and 80 are engageable by the edges 89 and 90 of the side portions 86 and 87, respectively, in the upper run. In the lower run 25 of the container belt 22, the snub return rollers 44 retain the container belt in position against the support rollers 28.

Referring to FIG. 7, the base portion 85 of the container belt 22 is bent in the transverse direction by the crowned tail pulley 33 and this action in addition to the forces exerted on the side portions 86 and 87 as the belt passes around the tail pulley increases the angle (c) of tilt of the side portions. Due to the stretchability of the container belt 22, substantially no relative movement of the container belt and the power belt 23 results and accordingly the same terminal pulleys such as tail pulley 33 and discharge pulley 34 may be used for both belts.

With this construction, the load L is supported by the side portions 86 and 87 of the container belt 22 and it is not necessary to provide support rollers to shape the container belt as it carries the load. In this way, the shuffling of the load is substantially eliminated and less power is required to drive the conveyor. In the present embodiment, the container belt 22 is driven at an operating speed of around 600 feet per minute. Much higher belt speeds for overland conveyors embodying this invention are possible because the load L is surrounded by the container belt 22 which prevents spillage and also protects the load from windage where the load may be blown away. The container belt 22 and power belt 23 of this invention are guided along the belt path and training devices including methods of roller adjustment normally required with a troughed belt are not needed. It is also evident from the above description that the conveyor 10 may be used in a passage 11 in which the distance between the floor 19 and roof 18 is very limited as in a coal mine where the veins are relatively thin. In this situation, it is important that only a minimum of the rock be removed to provide space for the conveyor.

While certain representative embodiments and details have been shown for the purpose of demonstrating the invention, it will be apparent to those skilled in the art that various changes and modifications may be made therein without departing from the spirit or scope of the invention.

I, therefore, particularly point out and distinctly claim as my invention:

1. In combination, a stretchable endless flexible belt of elastic material having a generally Ushaped cross section with a base portion and side portions, said side portions having longitudinally extending edges, at least two spaced layers of reinforcing members having a high modulus of elasticity molded in said belt of elastic material and extending transversely of said belt between said edges, said reinforcing members being positioned at spaced-apart locations longitudinally of said belt and having a generally U-shape to conform with the shape of said belt, two layers of biased cords of textile material being disposed between said layers of reinforcing members, said cords of one of said layers of biased cords being laid at an opposite bias angle to said cords of the other of said layers of biased cords, and said elastic material being stretchable in the longitudinal direction at installation at least 5 percent and thereafter being stretchable and contractible in the longitudinal direction to permit elongation of said base portion and said side portions of said belt in amounts sufficient to maintain the cross-sectional shape of the belt when the belt is in a horizontal curve.

2. In combination, an endless flexible container belt of elastic material having a generally U-shaped cross section with a base portion and side portions extending along a belt path, an endless flexible power belt in driving engagement with said base portion of said container belt, drive means in engagement with said power belt, a supporting structure having longitudinally spaced-apart support rollers in supporting engagement with said power belt and said container belt, guide rollers engageable with said side portions of said container belt and with the edges of said power belt, means to maintain tension in said container belt, said container belt having transversely extending reinforcing members at spaced-apart positions longitudinally of said belt, said elastic material between said reinforcing members being stretchable in the longitudinal direction to permit stretching of said base portion and said side portions of said container belt, said container belt and said power belt extending along a belt path, said belt path hving a terminal end, a terminal pulley mounted for rotation about a generally horizontal axis at said terminal end, said container belt and said power belt extending around said terminal pulley providing an upper and lower run of said container belt and said power belt and said terminal pulley having a crowned surface in engagement with the surfaces of said container belt and said power belt whereby said power belt is centered and said base portion of said container belt is bent and the turning radius of the edges of said side portions is reduced.

3. In combination, a stretchable endless flexible container belt of elastic material having a generally U-shaped cross section with a base portion and side portions extending along a belt path, a separate substantially inextensible endless flexible power belt in driving relationship with said base portion of said container belt, drive means in engagement with said power belt, a supporting structure having longitudinally spaced-apart support rollers in supporting engagement with said container belt, generally vertical guide rollers on said supporting structure engageable with said side portions of said container belt, said container belt being stretchable at installation at least 5 percent so that said side portions will remain in tension around horizontal curves in said belt path, said container belt having transversely extending reinforcing members located at spaced-apart positions longitudinally of said belt, said reinforcing members including at least two spaced layers of material having a high modulus of elasticity to maintain said U-shaped cross section, and said elastic material being stretchable and contractible in the longitudinal direction to permit elongation of said base portion and said side portions of said container belt a sufficient amount at installation to maintain tension across the full width of the belt when the belt is in a horizontal curve.

4. The combination of claim 1 wherein said container belt extends along a belt path, said belt path having a terminal end, a terminal pulley mounted for rotation about a generally horizontal axis at said terminal end, said terminal pulley having a crowned surface and said container belt extending around said terminal pulley in a bent configuration to reduce the turning radius of the edges of said side portions.

5. The combination of claim 3 wherein said supporting structure has a plurality of spaced-apart frame members disposed along said container belt and said support rollers and said guide rollers being mounted on said frame members.

6. The combination of claim 5 wherein said frame members are connected by a flexible spine member fastened to said frame members permitting positioning of said frame members along a curved path.

7. The combination of claim 6 wherein each of said frame members extends transversely of said belt path and said spine member is fastened to said frame members at a position generally along the center of said belt path.

8. The combination of claim 6 wherein said spine member is fastened beneath each of said frames.

9. The combination of claim 6 wherein said spine member is of a resilient material to resiliently bend said spine members around curves and position said frame members for guiding said container belt and said power belt around said curves.

10. The combination of claim 6 wherein said spine member has a number of sections pivotally joined together for relative vertical movement whereby said container belt is adaptable to operate along a belt path which is inclined at different angles.

11. The combination of claim 10 wherein at least two of said frame members are mounted on one of said sections of said spine member.

12. The combination of claim 10 wherein power belt hold-down rollers are mounted on at least some of said frame members and said power belt is directed around said power belt hold-down rollers located between said support rollers.

13. The combination of claim 6 wherein each of said frames has a side frame member spaced transversely of said belt path from said spine member, said side frame member extending longitudinally of said belt path and having ends in overlapping relation with the ends of adjacent side frame members to provide horizontal stability of said supporting structure.

14. The combination of claim 1 wherein said ends of said side frame members are spaced apart a predetermined distance to limit the relative angular movement of adjacent frame members.

15. The combination of claim 1 wherein at least one of said frame members fastened to each of said sections includes support means for supporting said supporting structure.

16. The combination of claim 1 wherein said support means includes a hanger extending upwardly from said frame to an overhead support member.

17. The combination of claim 16 wherein said overhead support member includes a monorail and said hanger has wheels in rolling engagement with said monorail.

18. In combination, an endless flexible container belt of elastic material having a generally U-shaped cross section with a base portion and side portions extending along a belt path, an endless flexible power belt in driving engagement with said base portion of said container belt, drive means in engagement with said power belt, a supporting structure having longitudinally spaced-apart support rollers in supporting engagement with said power belt and said container belt, guide rollers engageable with said side portions of said container belt and with the edges of said power belt, means to maintain tension in said container belt, said container belt having transversely extending reinforcing members at spaced-apart positions longitudinally of said belt, said elastic material between said reinforcing members being stretchable in the longitudinal direction to permit stretching of said base portion and said side portions of said container belt, said container belt and said power belt extending along a belt path, said belt path having a terminal end, a terminal pulley mounted for rotation about a generally horizontal axis at said terminal end, said container belt and said power belt extending around said terminal pulley providing an upper and lower run of said container belt and said power belt, said lower run of said container belt and said lower run of said power belt being located below said support rollers, a snub roller mounted between at least two of said support rollers and at the opposite side of said power belt from said support rollers and said snub roller being positioned with at least one portion of said snub roller extending into the belt path between said support rollers and holding said power belt in driving engagement with one of said support rollers for driving the support roller and said upper run of said container belt supported by the roller.

19. The combination of claim 18 wherein said power belt is interposed between said support rollers and said container belt and said snub roller is engageable with said base portion of said container belt.

20. The combination of claim 18 wherein said guide rollers include a plurality of rollers engageable with said lower run of said power belt and said lower run of said container belt.

* * * * *

UNITED STATES PATENT OFFICE
CERTIFICATE OF CORRECTION

Patent No. 4,061,223           Dated   December 6, 1977

Inventor(s)   Hebert E. McGinnis

It is certified that error appears in the above-identified patent and that said Letters Patent are hereby corrected as shown below:

Column 1, line 56, "other described" should read --others describe--.

Column 2, line 50, "two-elt" should read --two-belt--.

Column 7, line 33, "installtions" should read --installations--.

Column 11, line 63, "1" should read --3--.

Column 12, line 44, "1" should read --13--.

Column 12, line 48, "1" should read --11--.

Column 12, line 52, "1" should read --15--.

Signed and Sealed this

Eleventh Day of April 1978

[SEAL]

Attest:

RUTH C. MASON  
*Attesting Officer*

LUTRELLE F. PARKER  
*Acting Commissioner of Patents and Trademarks*